US009822936B2

(12) United States Patent
Caldon et al.

(10) Patent No.: US 9,822,936 B2
(45) Date of Patent: Nov. 21, 2017

(54) LIGHTING DEVICE AND ASSOCIATED METHOD

(75) Inventors: Matteo Caldon, Vigonovo (IT); Alessandro Scordino, Dolo (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/233,674

(22) PCT Filed: Jun. 27, 2012

(86) PCT No.: PCT/EP2012/062507
§ 371 (c)(1),
(2), (4) Date: Jan. 17, 2014

(87) PCT Pub. No.: WO2013/010767
PCT Pub. Date: Jan. 24, 2013

(65) Prior Publication Data
US 2014/0177221 A1    Jun. 26, 2014

(30) Foreign Application Priority Data

Jul. 18, 2011    (IT) .............................. TO2011A0643

(51) Int. Cl.
| F21V 7/04 | (2006.01) |
| F21K 99/00 | (2016.01) |
| F21V 5/00 | (2015.01) |
| F21V 7/00 | (2006.01) |
| F21V 13/04 | (2006.01) |

(Continued)

(52) U.S. Cl.
CPC ............... *F21K 9/54* (2013.01); *F21V 5/007* (2013.01); *F21V 7/0083* (2013.01); *F21V 13/04* (2013.01); *G02F 1/133603* (2013.01); *G02F 1/133605* (2013.01); F21V 5/08 (2013.01); *F21Y 2105/10* (2016.08); *F21Y 2115/10* (2016.08); *G02F 2001/133607* (2013.01)

(58) Field of Classification Search
CPC .............................. G02B 6/0023; G02B 6/003
USPC ........................................................... 362/612
See application file for complete search history.

(56) References Cited

U.S. PATENT DOCUMENTS 7,534,008 B2 *  5/2009  Kim et al. .................... 362/231
7,722,224 B1    5/2010  Coleman et al.
(Continued)

FOREIGN PATENT DOCUMENTS

CN    101000436    7/2007
DE    20 2009 011 500    12/2010

OTHER PUBLICATIONS

Search Report dated Jul. 1, 2015 which issued in the corresponding European Patent Application No. 12 733 042.1.

*Primary Examiner* — William Carter
(74) *Attorney, Agent, or Firm* — Cozen O'Connor

(57) ABSTRACT

A lighting device comprising light radiation sources (12a, 12b, 12c, 12d) arranged in a plurality of cells (CI, C2, C3, C4) wherein each cell comprises at least one light radiation source, an output screen (16) for receiving light radiation from said light radiation sources (12a, 12b, 12c, 12d), and optical elements (18, 20) arranged between said cells (CI, C2, C3, C4) and said screen (16) so as to convey onto said screen (16) with a uniformly distributed intensity the light radiation produced by said light radiation sources (12a, 12b, 12c, 12d), the illumination of said screen (16) resulting from the superimposition of light radiation individually produced by the cells of said plurality (CI, C2, C3, C4).

7 Claims, 2 Drawing Sheets

(51) Int. Cl.
  *G02F 1/1335* (2006.01)
  *F21V 5/08* (2006.01)
  *F21Y 105/10* (2016.01)
  *F21Y 115/10* (2016.01)

(56) References Cited

U.S. PATENT DOCUMENTS

| | | |
|---|---|---|
| 2007/0070625 A1 | 3/2007 | Bang |
| 2009/0103296 A1 | 4/2009 | Harbers et al. |
| 2012/0199852 A1* | 8/2012 | Lowes ................... G09F 9/33 257/88 |

* cited by examiner

US 9,822,936 B2

LIGHTING DEVICE AND ASSOCIATED METHOD

RELATED APPLICATIONS

This application is a U.S. National Phase Application under 35 USC 371 of International Application PCT/EP2012/062507 filed Jun. 27, 2012.

This application claims the priority of Italian application No. TO2011A000643 filed Jul. 18, 2011, the entire content of which is hereby incorporated by reference.

FIELD OF THE INVENTION

The description relates to lighting devices.

Various embodiments may refer to lighting devices having uniform lighting characteristics, for example in relation to the color mixing effect.

Various embodiments may refer to backlighting devices.

BACKGROUND OF THE INVENTION

When designing lighting devices such as, for example, backlighting devices it is sought to achieve an adequate level of color mixing and luminosity.

This need may arise for example in the case of lighting devices where light-emitting diodes (LEDs) are used as a light radiation device.

One way of reducing the cost of the lighting or illumination device is to provide the manufacturer with a wide choice of LEDs. This approach, however, raises critical issues with regard to mixing of the colors.

The inventors have ascertained that conventional solutions for solving this problem are based, for example, on the use of integrating spheres associated with the radiation sources. This solution, however, inevitably has a low optical efficiency owing to the high number of reflections required to achieve a suitable color mixing level.

It is also possible to use relatively complex optical systems which, in addition to the drawbacks associated with the complexity, including the cost, also have the drawback of having relatively large overall dimensions.

There also exist solutions based on the use of specific LED packages and a given number of light sources. These solutions, however, are not very flexible and are not suitable for possible future developments in terms of an increase in the LED efficiency or use of different light sources.

SUMMARY OF THE INVENTION

One object of the invention is to overcome the drawbacks described above, for example through the possibility of:

using several light radiation sources (e.g. LEDs) without having to pay particular attention to selection aspects depending on the color and/or luminosity characteristics or based on the so-called "binning class";

achieving a high degree of uniformity in terms of color and luminosity on a screen having different discrete light radiation sources;

manufacturing high-efficiency backlighting devices; and/or adapting the basic concept from several LEDs to a single LED.

This and other objects are attained in accordance with one aspect of the present invention directed to a lighting device comprising light radiation sources arranged in a plurality of cells wherein each cell comprises at least one light radiation source, an output screen for receiving light radiation from said light radiation sources, and optical elements arranged between said cells and said screen so as to convey onto said screen with a uniformly distributed intensity the light radiation produced by said light radiation sources, the illumination of said screen resulting from the superimposition of light radiation individually produced by the cells of said plurality.

Another aspect of the present invention is directed to a method for producing a lighting device, comprising: arranging light radiation sources in a plurality of cells wherein each cell comprises at least one light radiation source, providing an output screen for receiving light radiation from said light radiation sources, and arranging between said cells and said screen optical elements for conveying onto said screen with a uniformly distributed intensity the light radiation produced by said light radiation source, whereby illumination of said screen results from the superimposition of the light radiation individually produced by the cells of said plurality.

By means of various embodiments it is possible to achieve one or more of the following advantages:

- high degree of flexibility of the lighting device owing to the fact that each cell illuminates the screen in the same manner;
- possibility of operating also with a small number of cells provided with light radiation sources inside a matrix so that any future increase in the efficiency of the LEDs may be managed by reducing the number of populated cells;
- extending the flexibility also to the type of LED populating the cells: each cell may in fact consist of LEDs having characteristics which are different in terms of color and/or luminosity;
- possibility of adopting the same asymmetrical optical elements for different cells, without having to use a large number of different optical elements;
- availability of high-efficiency optical solutions which can be realized with small dimensions.

BRIEF DESCRIPTION OF THE DRAWINGS

The invention will now be described, purely by way of a non-limiting example, with reference to the accompanying figures in which.

DETAILED DESCRIPTION OF THE DRAWINGS

In the following description various specific details aimed at providing an in-depth understanding of the embodiments are described. The embodiments may be implemented using one or more of the specific details or using other methods, components, materials, etc. In other cases, known structures, materials or operations are not shown or described in detail so that the various aspects of the embodiments may be understood more clearly.

The reference to "an embodiment" in the context of this description indicates that a particular configuration, structure or characteristic feature described in relation to the embodiment is included in at least one embodiment. Therefore, phrases such as "in an embodiment", which may occur at various points in this description, do not necessarily refer to the same embodiment. Moreover, particular forms, structures or characteristic features may be combined in any suitable manner in one or more embodiments.

The reference numbers used here are provided solely for the sake of convenience and therefore do not define the scope of protection or the range of application of the embodiments.

In the figures of the accompanying drawings the reference number 10 indicates overall a lighting device (luminaire). In various embodiments, the source 10 may use, as light radiation source, light-emitting diodes or LEDs.

In various embodiments the light radiation sources 12 may be organized in a plurality of cells CI, C2, C3, C4 (four in number, organized as a 2×2 matrix, in the example of embodiment considered here, but the number of cells may consist of any number).

Each cell CI, C2, C3, C4 may in turn comprise any number of light radiation sources, such as for example LEDs, 12*a* (cell CI), 12*b* (cell C2), 12*c* (cell C3) or 12*d* (cell C4).

Figure 1:
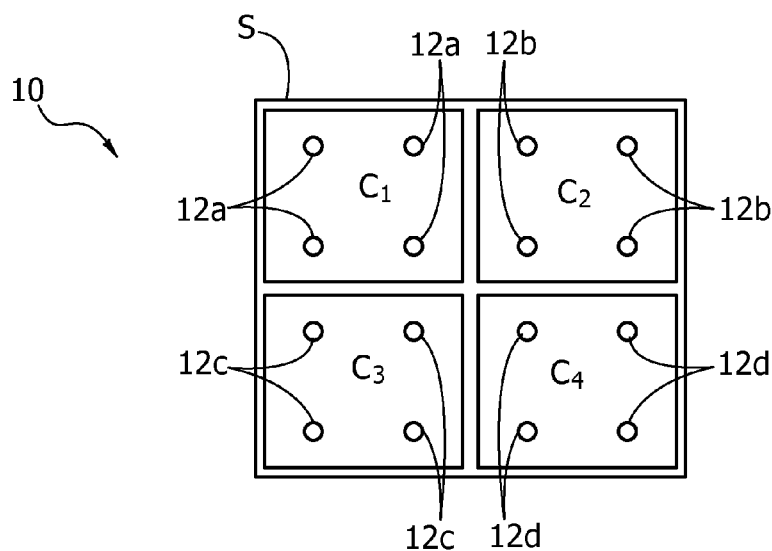
FIG. 1 shows the basic diagram of an embodiment.

The example of embodiment to which FIG. 1 refers envisages the presence, in each cell CI, C2, C3 and C4, of four light radiation sources.

Various embodiments may envisage that:
in one or more cells there is a single light source (a solution shown in FIGS. 3 and 4 for the sake of simpler illustration);
different cells comprise a different number of sources.

In various embodiments, in connection with the lighting device 10 the following may be distinguished in general:
a body 14 (see for example FIG. 5) able to house the light sources 12*a*, 12*b*, 12*c* and 12*d* as well as any power supply and drive circuits associated with them (of the known type and not shown in the figures); and
an illumination surface or screen 16 where the desired lighting effect is achieved.

In various embodiments, the surface or screen 16 has a flat progression with a shape which may be both a square/rectangular shape, as in the examples shown here, and a shape of a different type such as a polygonal, circular, ellipsoidal, mixtilinear or other shape.

Generally speaking, the propagation path of the light radiation from each source (for example any one of the LEDs 12*a*, 12*b*, 12*c* and 12*d*) and different points of the screen 16 is different.

For example, with reference to the schematic illustration shown in FIG. 3 (without considering for the time being the other elements which will be mentioned below) the source 12*c* (taken as an example of one of the sources present in the cell C3) is closer to that which in the figure is the left-hand edge of the screen 16 than the right-hand edge. In a complementary manner, the source 12*d* (taken as an example of one of the sources present in the cell C4) is closer to the right-hand edge of the screen 16 than the left-hand edge.

Seeing that each source 12*a*, 12*b*, 12*c*, 12*d* has an emission pattern with an approximately lobe-like distribution of the light intensity, in the absence of the measures described more fully below, the lighting effect on the screen 16 would therefore be non-uniform, with a light spot in the region of each source 12*a*, 12*b*, 12*c* and 12*d*, and less luminous zones in the spaces between the sources. In addition to this macroscopic non-uniform effect, other non-uniform effects may arise, for example in the case of the LEDs, since nominally identical sources may have luminosity characteristics (luminous flux intensity and/or color characteristics) which are at least slightly different: this situation forms the basis of the practice of classifying the LED light sources in so-called different "binning classes" depending on the luminous flux intensity and/or color characteristics.

Figure 3:
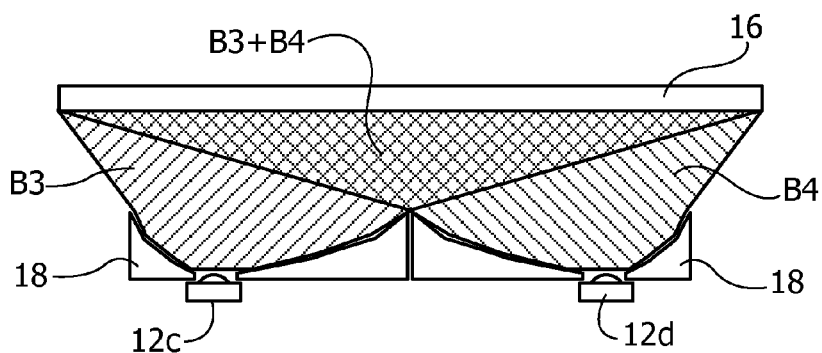
FIGS. 3 and 4, which are approximately comparable to cross-sectional views along the line III-III of FIG. 1, show possible details of embodiments.
Figure 4:
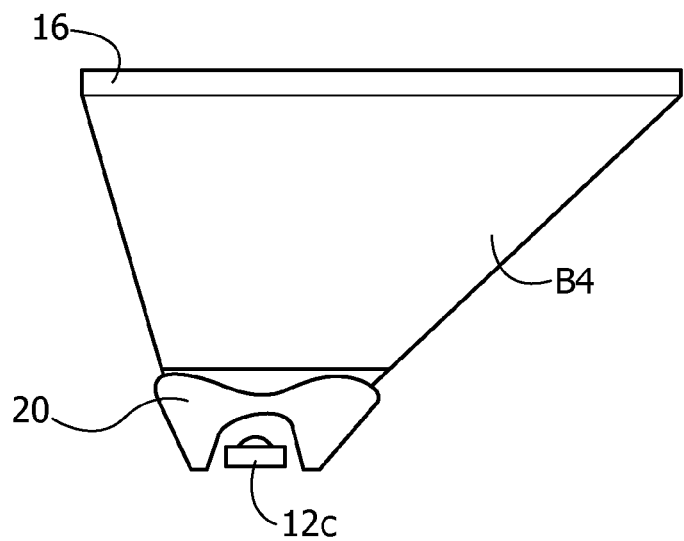

Various embodiments may instead envisage (as schematically shown in FIGS. 3 and 4) that, along the propagation path from the source generating it (for example any of the LEDs 12*a*, 12*b*, 12*c* and 12*d*) and the screen 16, the light radiation is subject to the action of an optical element having a so-called "homogenizing" function, such that the radiation produced by each source 12*a*, 12*b*, 12*c* and 12*d* reaches each point of the screen substantially with the same intensity, such as to create a substantially uniform lighting effect.

Such an optical element may take the form both of a reflector, such as the reflectors indicated by 18 in FIG. 3, and of a lens, such as the lens indicated by 20 in FIG. 4, which is at least approximately comparable to an anamorphic lens.

The characteristics of such an optical element (reflector 18 and/or lens 20—the two may also be used together) may be defined by adopting design criteria which are known per se, as described, for example, in reference texts, such as the text by Roland Winston et al., "Nonimaging Optics", Academic Press, 2004, depending on the emission characteristics of the light sources 12*a*, 12*b*, 12*c* and 12*d*.

Figure 2:
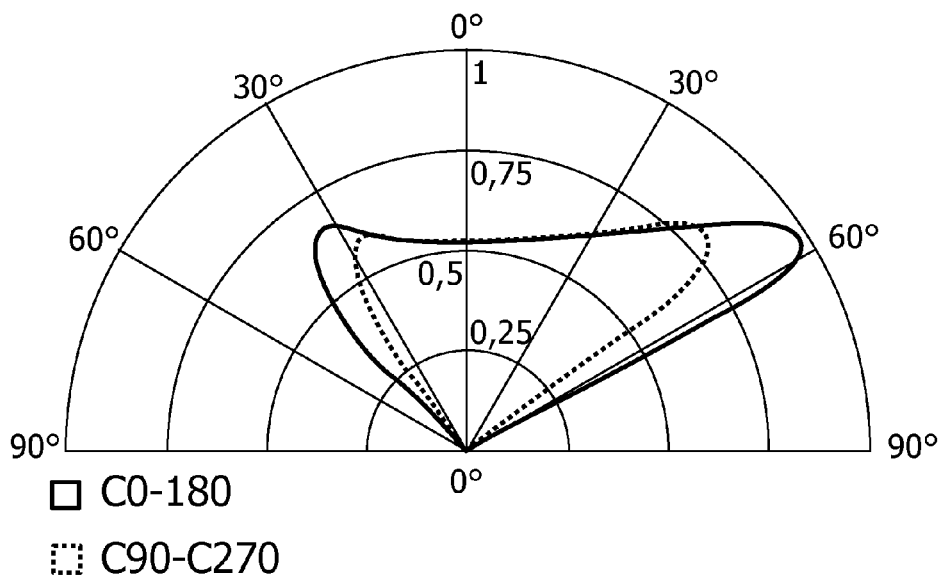
FIG. 2 shows the emission characteristics of a light radiation source.

For example, the diagram in FIG. 2 shows how, knowing the emission pattern of the source 12*c* of FIGS. 3 and 4, the reflector 18 and/or the lens 20 may be designed so as to obtain a radiation pattern having the progression shown along two orthogonal planes 0°-180° and 90°-270°; this radiation pattern, assuming that the source 12*c* is situated at the origin 0 of the diagram, has a minimum radiation transmission value at the axis of the source and increasing values away from this axis, such as to direct the luminous flux of the source towards the edges of the screen 16 by an amount greater than that which occurs towards the central region of the screen 16 itself.

In particular, this may occur with an asymmetrical progression, so that the radiation of the source is transmitted "more" towards the edge of the screen 16 furthest from the source 12*c* (the right-hand edge in FIGS. 3 and 4) and "less" towards the edge of the screen 16 furthest from the source 12*c* with the result of obtaining a uniform distribution of the luminous flux on the screen 16, preventing the formation of more luminous spots where the screen 16 is closer to the radiation sources.

It can be seen that the zero drop in the diagrams of FIG. 2 for angular values of about 30° and 45° (on the left-hand side of the diagrams) and about 50° and 60° (on the right-hand side of the diagrams) corresponds to values such that the radiation of the source 12*c* would finish being projected beyond the edges of the screen 16, not being useful for the purposes of illumination thereof.

In this way, the light radiation beam emitted by each source 12*a*, 12*b*, 12*c* and 12*d* is subject to a modeling or beam forming action aimed at ensuring that all the points on the surface of the screen 16 are illuminated by each source with a substantially uniform distribution of the light intensity.

Expressed in other words, while in the absence of the reflector 18 and/or the optical element 20, the radiation emitted by each source 12*a*, 12*b*, 12*c*, 12*d* would reach the screen 16 with a different intensity at different points on the screen with the formation of the luminous spots mentioned above, in various embodiments, the characteristics of the reflector 18 and/or of the optical lens 20 associated with each source 12*a*, 12*b*, 12*c*, 12*d* may be determined depending on:

i) the radiation pattern of the individual light source (known and in any case able to be determined experimentally for each type of source) and/or ii) the positioning geometry of each source 12a, 12b, 12c, 12d with respect to the screen, with the effect of homogenizing the lighting of the screen 16 by the individual light source 12.

For the sake of simplicity, the above considerations refer to the "two-dimensional" model represented by the diagram in FIG. 2 (radiation pattern in two orthogonal planes 0°-180° and 90°-270°), namely with reference to the distance of the source 12c from two opposite sides of the screen 16:

various embodiments may refer to the distance of the source 12c from all the peripheral portions of the screen 16, resulting in the definition of a three-dimensional radiation pattern for the optical element 18 or 20.

Various embodiments may envisage that several sources 12a, 12b, 12c, 12d included within a cell CI, C2, C3, C4 share a common optical element 18 and/or 20, the radiation pattern of which is defined taking into account (for example on an averaged basis) the radiation and/or geometric location characteristics of the sources which share this common optical element.

Furthermore, in various embodiments, the same geometric configuration of the reflector 18 and/or lens 20 may be used in different cells CI, C2, C3, C4, adopting an orientation of the reflector 18 and/or of the lens 20 which is different from cell to cell.

For example, the diagram shown in FIG. 3 illustrates the possibility of using in two different cells (for example the cell C3 (source 12c) and the cell C4 (source 12d) the same asymmetrical reflector structure 18 oriented in different positions, for example diametrically opposite positions, in the two cells C3 and C4.

Considerations of an entirely similar nature apply to the possibility of using in two different cells the same asymmetrical lens 20 oriented in different positions in different cells.

Furthermore, the considerations indicated above with reference to the luminous flux intensity and the homogenizing action performed by the optical elements 18 and/or 20 may be also applied to the color characteristics of the sources 12a, 12b, 12c, 12d, for example by using lens 20 with color characteristics which are different for different sources/cells.

With regard to both the luminous flux intensity and the color characteristics, the presence of several cells CI, C2, C3 and C4 may be used to create a further homogenizing effect: each point on the screen 16 is in fact illuminated by all the cells CI, C2, C3 and C4 so that the overall lighting action results from superimposition of the lighting action of the single cells CI, C2, C3 and C4, with a consequent averaging effect.

For example, FIG. 3 shows schematically how the beam B3, generated by the source 12c of the cell C3, and the beam B4, generated by the source 12d of the cell C3, are added to-gether (B3+B4) upon reaching the screen 16.

Similar considerations are applicable to lenses such as the lens 20 in FIG. 4 which generates a light beam indicated by B4.

Various embodiments may therefore be based on the concept of:

taking the screen 16 of the device 10 (surface generally identifiable as S);

dividing up the area from where the light radiation is sent onto the screen (namely the area where the light sources 12a, 12b, 12c, 12d are located) in a matrix arrangement (for example a 2×2, 3×3 or generally N×M matrix arrangement) or also a structure of a different type, for example a honeycomb structure, with cells which are identical to or different from each other, wherein each cell is generally identified as Ci, associating with each cell Ci an optical element, namely a respective structure for propagation of the light radiation (for example a reflector 18 and/or a lens 20), such that, depending on the angles of aperture of the photometric curve as a function of the distance between the individual light radiation source and the surface S, each light radiation source 12a, 12b, 12c, 12d produces a uniform illumination of the surface S (refer to diagram in FIG. 2).

The surface S may thus be illuminated by the sum (super-imposition) of the light radiation emitted by the sources 12a, 12b, 12c, 12d in the various cells CI, C2, C3, C4. All of which with an overall lighting effect which has a substantial uniformity (also from a color point of view) attributable to the fact that the light supplied by different light radiation sources which already have substantially uniform characteristics in terms of luminous flux intensity is added together or superimposed on the surface S.

In various embodiments it is thus possible to provide a lighting device comprising light radiation sources (e.g. the LEDs 12a, 12b, 12c, 12d) arranged in a plurality of cells CI, C2, C3, C4 in which each cell comprises at least one light radiation source, the device also comprising an output screen 16 for receiving light radiation from the abovementioned light radiation sources and optical elements (such as reflectors 18 and/or lens 20) arranged between the cells CI, C2, C3, C4 and the screen 16 so as to convey onto the screen 16 itself, with a uniformly distributed intensity, the light radiation produced by the light radiation sources 12a, 12b, 12c, 12d. Illumination of the screen 16 is thus the result of superimposition of the light radiation produced individually by the cells CI, C2, C3, C4.

As seen above, in particular with reference to FIGS. 2 to 4, in various embodiments, the light radiation transmission characteristics of the optical elements (reflectors 18 and/or lens 20) may be determined depending on:

the position of the cells CI, C2, C3, C4 with respect to the screen 16; and the radiation pattern of the light radiation source or sources 12a, 12b, 12c, 12d included in the respective cells CI, C2, C3, C4 with which the optical element 18 and/or 20 is associated.

As regards the design of the optical elements 18 and 20, solutions of the known type may be used, for example by providing reflectors made of plastic material with metallized reflective surfaces and/or using optical elements 20 for ex-ample in the form of so-called "free-form optics" and therefore with substantially asymmetrical characteristics. Optical elements of this kind may be made for example using glass materials or plastic materials such as PMMA or polycarbonate.

By means of various embodiments it is possible to satisfy in an excellent manner the need for uniform lighting which is required, for example, when illuminating both domestic environments and working environments.

The high quality of the light radiation emitted, due to the uniformity of the light intensity and colors, is achieved, thus creating a relaxing sensation for the users.

This relaxing effect may be further increased in various embodiments using a screen 16 which has diffusion characteristics determined for example by the presence of associated diffusion elements of the known type and/or a micro-optical film intended to limit the dazzle effects or "glare index".

Figure 5:
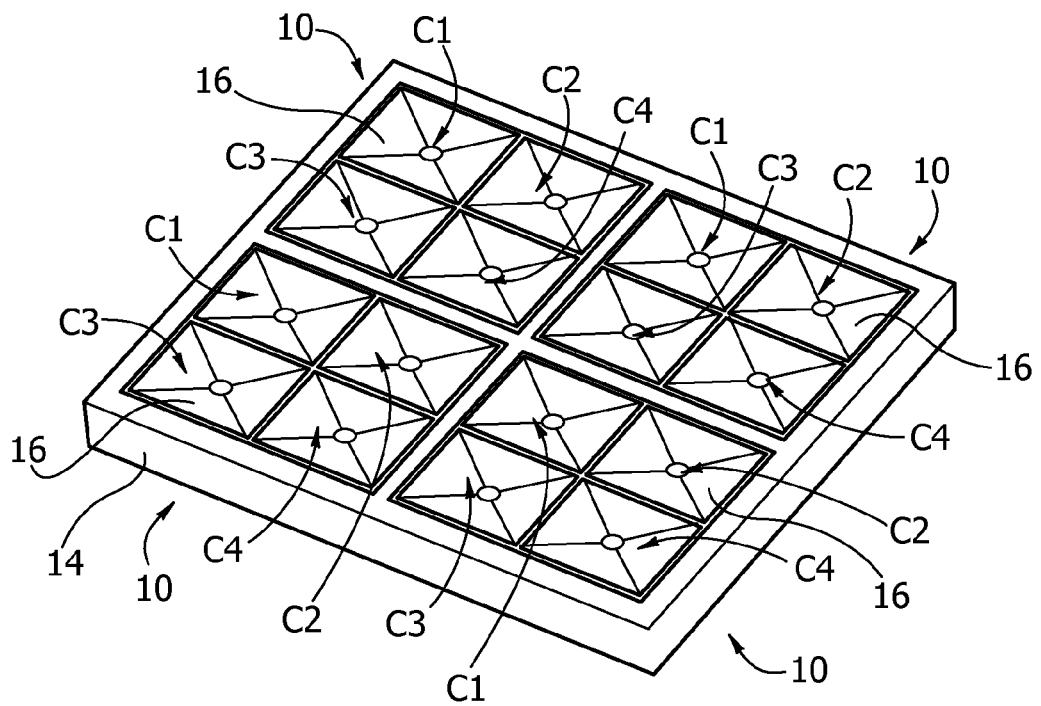
FIG. 5 is a perspective view of an embodiment.

FIG. 5 shows a possible embodiment in which a plurality of lighting devices 10 as described above (for example four devices 10) are assembled together in a 2×2 matrix, for example with the possibility of having respective screens 16 which form different parts of a single body.

Obviously, both the number of devices 10 and their geometrical arrangement may be different from those shown in FIG. 5, thus highlighting the flexible nature of the embodiments.

Without affecting the principle of the invention, the embodiments and the constructional details may vary, also significantly, with respect to that described and illustrated purely by way of a non-limiting example, without thereby departing from the scope of the invention as defined in the accompanying claims.

The invention claimed is:

1. A lighting device comprising:
    a plurality of cells;
    at least one light radiation source arranged in each of the plurality of cells to produce light radiation;
    an output screen configured to receive, and be illuminated by, the light radiation from each of said light radiation sources in the plurality of cells, and
    a reflector arranged between each light radiation source and said output screen and configured to reflect onto said output screen, with a uniformly distributed intensity over said output screen, the light radiation produced by said light radiation sources, each reflector conveying a respective light radiation transmission pattern, the illumination of said output screen resulting from superimposition of light radiation individually produced by the cells of said plurality of cells,
    wherein the respective light radiation transmission pattern conveyed by each reflector is determined based at least in part on at least one of a light radiation pattern of a respective light radiation source and a position of a respective light radiation source with respect to said output screen; and
    wherein reflectors associated with at least two of said cells are identical to each other having identical respective light radiation transmission patterns and are arranged with a different spatial orientation from cell to cell with regard to their respective light radiation sources such that the reflectors and their respective patterns are rotated with respect to one another.

2. The device of claim 1, wherein at least one of said reflectors is asymmetrical.

3. The device of claim 1, wherein said output screen is a diffusive screen.

4. The device of claim 1, wherein said light radiation sources include LEDs.

5. The device of claim 1, wherein said cells are arranged in a matrix configuration.

6. A method for producing a lighting device, comprising:
    arranging light radiation sources in a plurality of cells, wherein each cell comprises at least one light radiation source,
    providing an output screen for receiving, and for being illuminated by, light radiation from said light radiation sources, and
    arranging, between said light radiation sources and said output screen, reflectors configured to reflect onto said output screen, with a uniformly distributed intensity over said output screen, the light radiation produced by said light radiation sources, whereby illumination of said output screen results from the superimposition of the light radiation individually produced by the cells of said plurality of cells,
    wherein optical elements reflectors associated with at least two of said cells are identical to each other and are arranged with a different spatial orientation from cell to cell with regard to their respective light radiation sources and are rotated with respect to one another.

7. The method of claim 6, further comprising selecting the light radiation transmission characteristics of said reflectors depending on:
    the location of said cells with respect to said output screen, and
    the radiation pattern of the at least one light radiation sources included in the respective cell with which the reflector is associated.

* * * * *